US 8,881,498 B2

(12) United States Patent
Olia et al.

(10) Patent No.: US 8,881,498 B2
(45) Date of Patent: Nov. 11, 2014

(54) METHOD FOR PRIMARY CONTROL OF A COMBINED GAS AND STEAM TURBINE ARRANGEMENT

(75) Inventors: Hamid Olia, Zurich (CH); Jan Schlesier, Wettingen (CH); Martin Schoenenberger, Zurich (CH)

(73) Assignee: Alstom Technology Ltd, Baden (CH)

( * ) Notice: Subject to any disclaimer, the term of this patent is extended or adjusted under 35 U.S.C. 154(b) by 1511 days.

(21) Appl. No.: 12/492,959

(22) Filed: Jun. 26, 2009

(65) Prior Publication Data

US 2009/0320493 A1 Dec. 31, 2009

(30) Foreign Application Priority Data

Jun. 27, 2008 (DE) .......................... 10 2008 030 170
Jul. 21, 2008 (CH) ...................................... 1127/08

(51) Int. Cl.
| F02C 9/00 | (2006.01) |
| F01D 17/04 | (2006.01) |
| F01D 17/14 | (2006.01) |
| F02C 6/18 | (2006.01) |
| F01K 23/10 | (2006.01) |

(52) U.S. Cl.
CPC ................ *F02C 6/18* (2013.01); *F01D 17/145* (2013.01); *Y02E 20/16* (2013.01); *F01K 23/101* (2013.01)
USPC .............................. 60/39.3; 60/773; 60/39.22

(58) Field of Classification Search
USPC ......... 60/772, 773, 39.22, 39.24, 39.25, 39.3; 700/286, 287, 290
See application file for complete search history.

(56) References Cited

U.S. PATENT DOCUMENTS

| 6,134,891 A | 10/2000 | Zaviska et al. | |
| 6,912,855 B2 * | 7/2005 | Bescherer et al. | 60/772 |
| 7,274,111 B2 * | 9/2007 | Andrew et al. | 290/52 |
| 2003/0010037 A1 * | 1/2003 | Vugdelija | 60/772 |

FOREIGN PATENT DOCUMENTS

| DE | 3632041 | 4/1987 |
| EP | 1174591 | 1/2002 |
| EP | 1275822 | 1/2003 |
| EP | 1301690 | 4/2003 |
| EP | 1437484 | 7/2004 |
| WO | WO-9733074 | 9/1997 |
| WO | WO-2006097495 | 9/2006 |

OTHER PUBLICATIONS

International Search Report by European Patent Office for CH 11272008, mailed on Dec. 12, 2008.

* cited by examiner

*Primary Examiner* — Andrew Nguyen
(74) *Attorney, Agent, or Firm* — Buchanan Ingersoll & Rooney PC

(57) ABSTRACT

A method for primary regulation of a combined gas and steam turbine installation in network operation, wherein the combined gas and steam turbine installation includes a gas turbine and a steam turbine arranged along at least one shaft includes operating at least one steam turbine actuating valve on a restricted basis along a working steam supply line to at least one pressure stage of the steam turbine so as to provide a steady-state steam turbine reserve power, wherein the at least one steam turbine actuating valve is changed to a less restricted state if a network frequency decreases so as to require network frequency support.

8 Claims, 4 Drawing Sheets

METHOD FOR PRIMARY CONTROL OF A COMBINED GAS AND STEAM TURBINE ARRANGEMENT

Priority is claimed to German Application No. DE 10 2008 030170.1, filed Jun. 27, 2008 and Swiss Application No. CH 01127/08, filed Jul. 21, 2008.

The invention relates to a method for primary regulation of a combined gas and steam turbine installation in network operation, which is arranged along a common shaft or separate shafts in each case and in which, in order to provide reserve power, an actuating valve is operated on a restricted basis along a working steam supply line to at least one pressure stage of the steam turbine and is changed to an at least less restricted state if the network frequency decreases and network frequency support is required in consequence.

BACKGROUND

Combined gas and steam turbine installations are installations in which the waste heat created in the gas turbine part is thermally coupled, in the form of exhaust gases, to a waste-heat boiler for operation of a steam turbine installation. The exhaust-gas temperature of the gas turbine is normally kept as constant as possible over a wide power range, although this restricts rapid load changes on the gas turbine installation. The load change capability is essentially limited by the dynamics of the exhaust-gas temperature regulation, and therefore the capability to vary the air mass flow of the gas turbine. The steam turbine part of the installation follows the power changes of the gas turbine essentially with a considerably more inert time response. In consequence, in the case of combined gas and steam turbine installations in network operation, it is normal to cope with any power changes required by the network, in particular for network frequency stabilization purposes, solely by the respective gas turbine part of the installation, not least because the steam turbine part cannot contribute anything to this in the first seconds. It is therefore necessary for the total reserve power for power regulation in network operation to be provided by the gas turbine; a situation which in the end results in the block power which is maintained in the steady state of the gas turbine installation to cover the reserve power being reduced by a corresponding power component in order to make it possible to compensate for the delayed contribution of the steam turbine in seconds, not least because the network operator is obliged to guarantee a specific alternating-current frequency, for example at 50 Hz in Europe, which is stable over time and with respect to the demanded electrical power. The frequency stability in the network is ensured by dynamic load/power matching, for which it is necessary to ensure that considerable reserve powers are available within seconds.

EP 1 301 690 B1 discloses a method relating to this for primary regulation of a combined gas and gas turbine installation, in which the steam turbine is operated, in order to quickly provide reserve power, such that at least one pressure stage of the steam part is operated with a restricted valve position, thus forming a frequency support power reserve which is used for frequency support in the event of an under-frequency on the network side, by reducing the restriction of the actuating valve in accordance with the extent to which the frequency is undershot. The time period of reduced restriction is in this case designed on the basis of a restricted-time fading signal.

The restricting of the actuating valves results in a ram-air pressure being built up in front of the respective pressure stage in the steam turbine part, which can be released in the form of stored reserve power as required by opening the actuating valves, with the magnitude of the reserve power depending on the extent of the restriction. If the restriction is removed, then the ram-air pressure builds up slowly, as a result of which the stored reserve power can be additionally emitted by the steam turbine, in the form of so-called primary regulation power. Operation of the steam turbine in this way on the one hand makes it possible to provide a higher steady-state block power, which can be provided in particular by the gas turbine installation, while on the other hand the steam turbine can provide its reserve power component virtually without any time delay, that is to say within a few seconds, which in the end leads to a total delay-free and greater primary regulation power of the combined gas and steam turbine installation.

SUMMARY OF THE INVENTION

An aspect of the present invention is to provide a method for primary regulation of a combined gas and steam turbine installation in network operation, which is arranged along a common shaft or separate shafts in each case and in which, in order to provide a reserve power, an actuating valve is operated on a restricted basis along a working steam supply line to at least one pressure stage of the steam turbine and is changed to an at least less restricted state if the network frequency decreases and network frequency support is required in consequence, such that the regulation concept for the actuating valve position is simplified on the one hand, and on the other hand is matched to the individual operating behavior of the gas turbine installation, while avoiding the use of the previous practice, involving the use of a fading signal.

According to the solution, a method for primary regulation of a combined gas and steam turbine installation in network operation is distinguished by the following method steps:

The primary factor is to identify the occurrence of a network disturbance in the form of a faulty discrepancy between the network frequency and the network nominal frequency by monitoring the rotation speed of the shaft which is connected to the gas turbine, and by detecting any frequency discrepancies between the actual frequency and a frequency nominal value. The detected frequency discrepancy is used to determine a so-called primary regulation nominal power which can be provided by the gas turbine installation in order to maintain a desired stabilized network frequency. Another factor is to determine a power discrepancy between the primary regulation nominal power and a power which is actually emitted by the gas turbine, the so-called gas turbine actual power, with the two power values preferably being subtracted from one another in order in the end to obtain information as to whether and how much more or less power the gas turbine must provide, measured on the basis of the primary regulation nominal power.

In the end, this power discrepancy is used to determine that power contribution which must be provided briefly by the steam turbine part for network frequency support purposes in the disturbance situation described above, in particular in that situation in which the gas turbine actual power is less than the required primary regulation nominal power. In this situation, the reserve power which is maintained by the steam turbine during the course of the restricted operating state can be released at short notice. In this case, the determined power discrepancy is used as a manipulated variable for the actuating valve, as a result of which the power emitted from the steam turbine corresponds to the required primary regulation steam turbine nominal power.

The method according to the solution is therefore distinguished in that the power contribution which is additionally demanded from the steam turbine part by regulated reduction of the restriction of the actuating valve of at least one pressure stage depends exclusively on the operating behavior of the gas turbine part, to be precise such that the difference between the primary regulation nominal power and the actual power in fact being produced by the gas turbine corresponds exactly to that energy contribution which must additionally be made available by the steam turbine. This applies not only in the situation described above of network frequency support in the event of a spontaneously occurring underfrequency, by reserve power being demanded from the steam turbine, but also in the situation in which an overfrequency occurs during network operation, in which the actual power in fact produced by the gas turbine is greater than the determined primary regulation nominal power. In this case, the power contribution provided by the gas turbine is reduced by precisely the same amount as that by which the gas turbine actual power is greater than the primary regulation nominal power.

The method according to the solution is therefore completely independent of predefined controlled variables, for example as represented by the fading signal used in EP 1 301 690 B1, and is essentially based on the instantaneous power behavior of the gas turbine subject to changing network frequency conditions.

BRIEF DESCRIPTION OF THE DRAWINGS

The invention will be described with reference to examples in the following text, without restriction of the general inventive idea, on the basis of exemplary embodiments and with reference to the drawings, in which.

DETAILED DESCRIPTION

Figure 1:
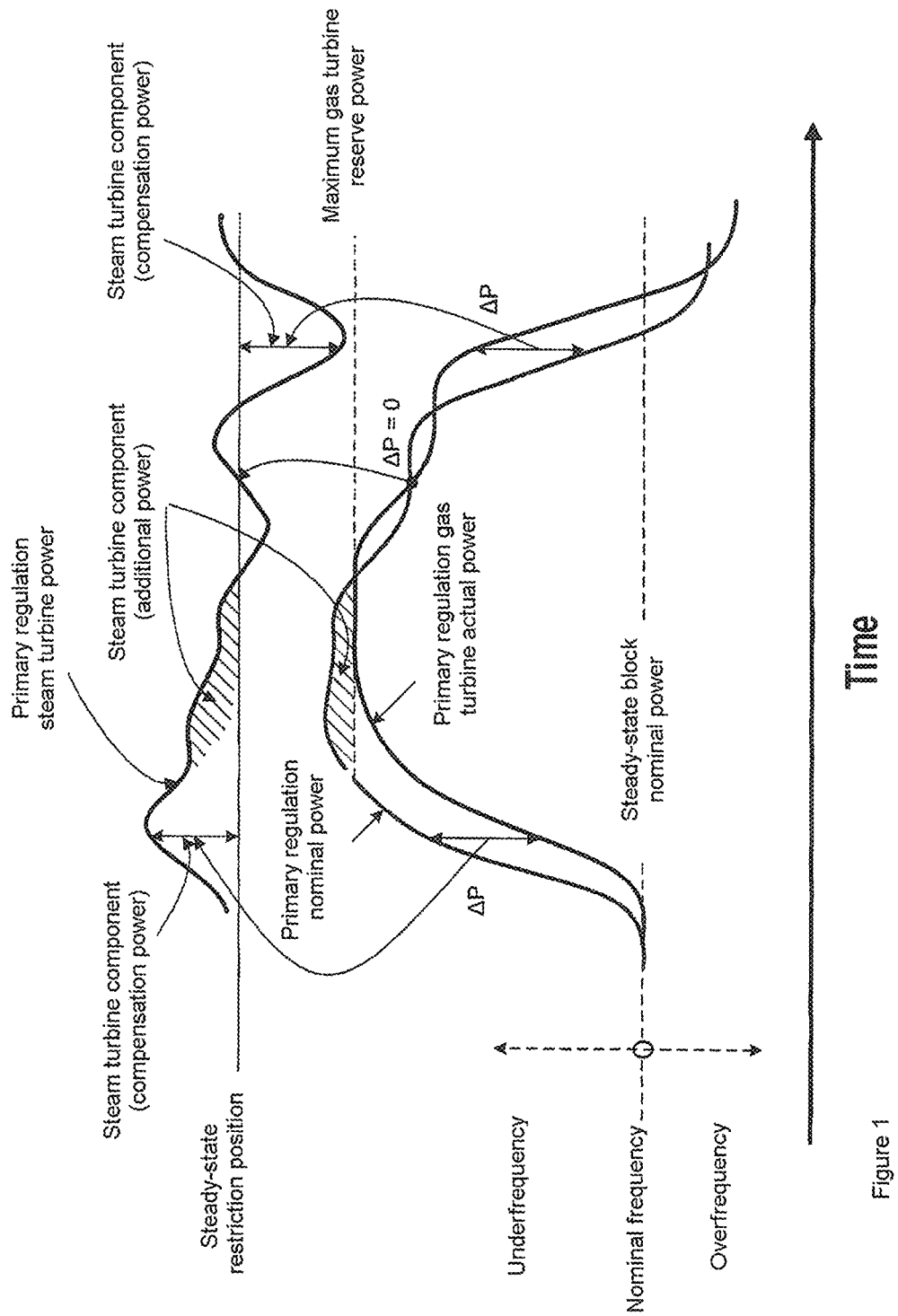
FIG. 1 shows an illustration, in the form of a graph of the regulation concept for a combined gas/steam turbine installation.

The regulation concept according to the solution that is described above for positioning of the actuating valve along a working steam supply line to at least one pressure stage of the steam turbine will be explained in more detail with reference to FIG. 1.

The function profiles of the power contributions of both the gas turbine part (see the lower function profiles) and the power contribution of the steam turbine part (see the upper function profile) are illustrated over the time axis t. It is assumed that there is a disturbance in the network frequency at an initial time, for example by the network frequency dropping, that is to say an underfrequency occurs in the network. Starting from a so-called steady-state block power, which is demanded by the combined gas/steam turbine installation in order to maintain a stable network nominal frequency, the combined installation reacts to a primary regulation nominal power with a rapidly rising primary regulation gas turbine actual power, although this cannot be provided simultaneously by the gas turbine, because of the inertia that is intrinsic to the system. A difference ΔP therefore occurs between the determined primary regulation nominal power and the primary regulation gas turbine actual power which is in fact emitted by the gas turbine installation. On the basis of the detected power discrepancy ΔP between the nominal power and the actual power of the gas turbine, a regulation signal is generated which leads to spontaneous opening of the actuating valve in the steam turbine part, as a result of which the steam turbine makes available exactly that power component which cannot be provided by the gas turbine because of the short notice, by spontaneous use of the reserve power during restricted operation. As can be seen from the graph in FIG. 1, the respective power contribution ΔP which is additionally emitted by the steam turbine, corresponds exactly to the nominal/actual difference of the gas turbine power contribution. Even in the situation in which the primary regulation nominal power overshoots the maximum reserve power of the gas turbine, the steam turbine can provide the additional power which is required to support the network frequency.

If the primary regulation nominal power and the primary regulation gas turbine actual power match—which is the case at the respective intersections of the two function profiles—then the steam turbine does not need to make any further power contribution, as a result of which, at those points, the power characteristic of the steam turbine intersects the abscissa which is shown in the upper illustration, that is to say the actuating valve is located in the steady-state restriction position, in which the pressure of the working steam upstream of the actuating valve is increased until equilibrium is reached between the waste-heat boiler feed water flow and the steam mass flow at the outlet of the waste-heat boiler within the steam turbine installation.

If, in contrast, the primary regulation nominal power is less than the primary regulation gas turbine actual power in fact being produced by the gas turbine, then the actuating valve is restricted to a greater extent, as a result of which the steam turbine emits less power, to be precise to the extent to which the power output from the gas turbine is greater than the required primary regulation nominal power. This is illustrated in the area of the falling function profiles of the gas turbine power.

Figure 2:
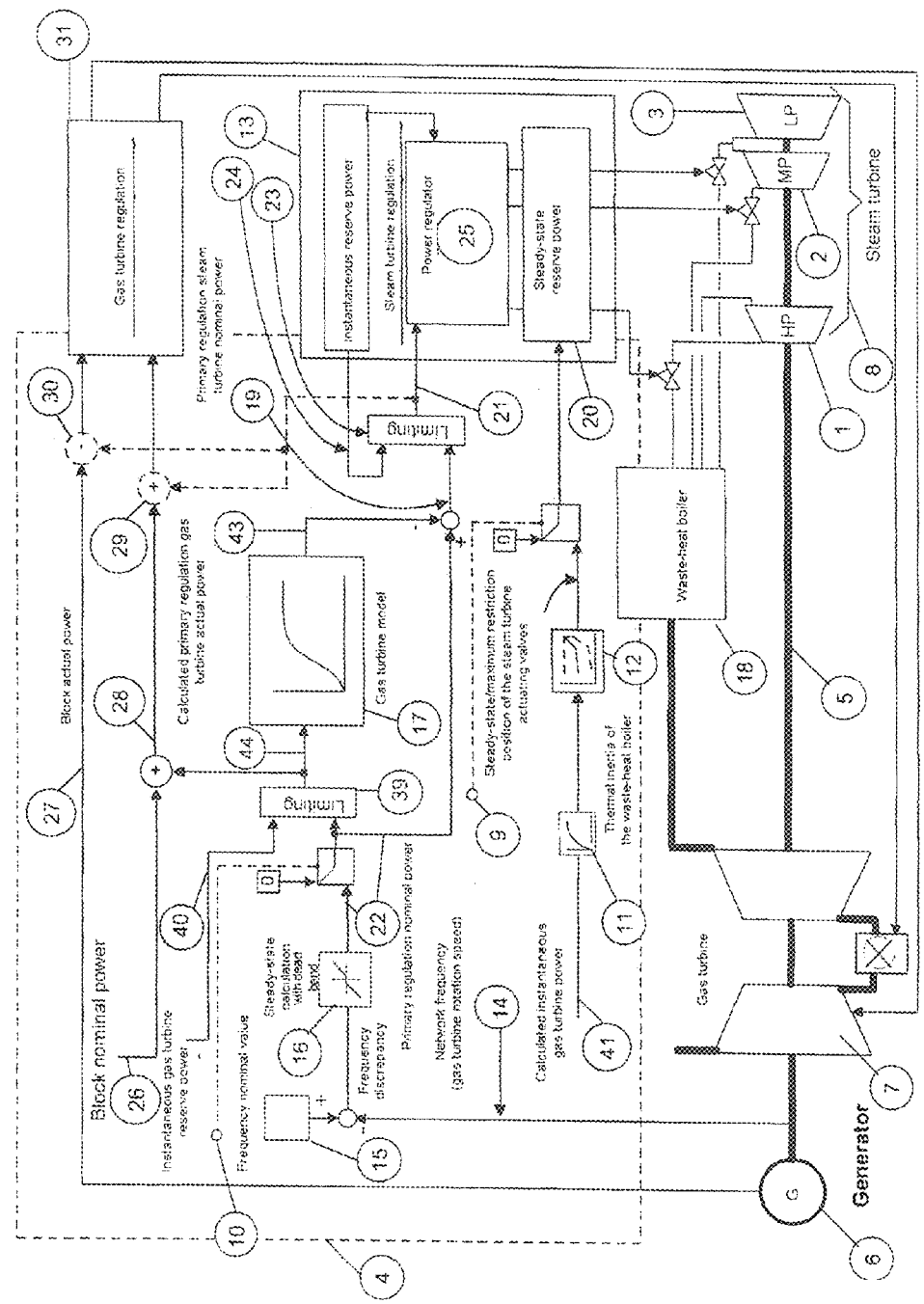
FIG. 2 shows a block diagram of the regulation concept for a combined single-shaft gas/steam turbine installation.

With regard to the technical implementation of the method according to the solution, a distinction must be drawn between two cases, specifically a combined gas and steam turbine installation in which both the gas and the steam turbine part drive a common shaft in order to obtain electrical energy by means of a single generator, and the case in which the gas and steam turbine each drive two separate shafts, which are each connected to separate generator units. The block diagram illustrated in FIG. 2 shows the first-mentioned case above, in which the gas turbine part, which is illustrated with reference symbol 7 is connected via a common shaft 5 to the steam turbine part 8, comprising a high-pressure steam turbine 1, a medium-pressure steam turbine 2 and a low-pressure steam turbine 3, which shaft is at the same time connected to a generator 6 in order to obtain electrical energy. The hot exhaust gases which emerge from the gas turbine 7 are fed into a waste-heat boiler 18 in order to exchange heat with a working medium which is then used as steam for driving the high-pressure, medium-pressure and low-pressure steam turbines 1, 2, 3.

The combined gas-steam turbine installation illustrated in FIG. 2 is operated in the sense described above such that at least the actuating valves which are provided along the working steam supply lines to the high-pressure and medium-pressure turbine are operated on a restricted basis in order to provide a power reserve on the steam turbine side. In order to influence the power output of the combined gas/steam turbine installation, gas turbine regulation 31 is provided on the one hand, which directly influences the power regulation in the course of the fuel supply and the air supply, while on the other hand steam turbine regulation 13 is provided, which regulates the valve position of the actuating valves along the working steam supply lines to the respective pressure stages. The area on a gray background in FIG. 2 comprises a regulation device 4 for primary regulation according to the method on which the solution is based.

In order to make it possible to react with a steam turbine power contribution at all, in principle, when a network frequency change occurs, reserve power must be built up in advance on the steam turbine side. The preparation of the steam turbine for primary regulation can be activated by means of an on/off signal 9, in which case, in order to determine a required steady-state reserve power 20 which must be maintained, both the actual gas turbine power 41 which is provided by the gas turbine 7 and which is advantageously not calculated directly by measurement by a direct power tapping, possibly on the shaft 5, but in fact in the course of a mathematical model and thermal inertia of the waste-heat boiler 11 must be used, taking account of a function 12. The function 12 defines the steady-state and the maximum permissible restriction positions of the steam turbine actuating valves as a function of the instantaneous gas turbine actual power 41, in the form of a mathematical equation or a table.

The steady-state restriction position of the steam turbine actuating valves determined in this way is in each case converted within the steam turbine regulation 13 to a position of the actuating valves for restriction of the pressure in the respective pressure stages. The extent of the restriction of the actuating valves leads to a pressure increase in the individual pressure stages, which corresponds precisely to the required ram-air pressure for the predetermined reserve power 20.

The primary regulation according to the solution for operation of the combined gas and steam turbine can be switched on and off by means of a further on/off signal 10.

The instantaneous steam turbine or gas turbine rotation speed 14 is detected continuously along the shaft 5 and, after conversion to a frequency, is compared with the frequency nominal value 15. Frequency discrepancies which occur are in the end converted by a predefined steady-state calculation 16 to a primary regulation nominal power 22, with the steady-state calculation 16 including a dead band which can be considered to be a discriminator and distinguishes between serious disturbances and those disturbance fluctuations which occur for a short time and can be coped with by the combined gas and steam turbine installation during normal operations. For example, if the detected frequency discrepancies are within the dead band mentioned above, that is to say they are minor disturbances, then the primary regulation nominal power is equal to zero.

If the regulation device is in the activated state as a result of activation of the switch 10, then a primary regulation steam turbine nominal power 19 is obtained from the determined primary regulation nominal power 22 taking account of the instantaneous gas turbine reserve power 40 and making use of the primary regulation gas turbine actual power 43 obtained by means of a gas turbine model 17. In the main, the difference between the mathematically modeled primary regulation gas turbine actual power 44 and the primary regulation nominal power 22 is formed in this case, corresponding to the primary regulation steam turbine nominal power 19.

One possible model of the gas turbine power can be obtained using the following mathematical relationship:

$$P_{calculated\ primary\ gas\,turbine\,actual} = KDF\left[\frac{1}{(1+s\cdot T/n)}\right]^n$$

where $$T = f\!\left(KDF\frac{T_1}{1+sT_2}\right)$$

where
  T, $T_1$, $T_2$ time constants, depending on the gas turbine inertia and the regulation concept,
  S Laplace operator
  N order of the model
  KDF primary regulation nominal power 22
  f function The order and the time constants are dependent on the gas turbine inertia and the regulation concept, with the time constants T being between 0 and 4 seconds.

The limiting 39 which precedes the subtraction process is used only for selection of a minimum for determination of the greatest possible primary regulation gas turbine nominal power 44, taking account of the reserve power 40 maintained by the gas turbine, which is necessary in order to make it possible to provide additional power by means of the steam turbine despite the exhaustion of the gas turbine reserve power.

The primary regulation steam turbine nominal power 19, which is obtained as above and determined essentially from the difference between the primary regulation nominal power and the primary regulation gas turbine actual power is passed on, after limiting 23 and taking account of the reserve power 24 instantaneously available from the steam turbine installation, to the power regulator 25 of the steam turbine regulation 13 by means of which, in the end, the actuating valves are operated along the individual working steam supply lines to the high-pressure and medium-pressure stage of the steam turbine. In this case, the instantaneous reserve power of the steam turbine 24 is calculated from the currently restricted actuating valve positions along a respective working steam supply line and the steam turbine operating state associated with this (steam pressure, temperature and mass flow). The sum of all the instantaneously maintained reserve powers of all the actuating valves 24 define the limitation of the maximum permissible power changes which can be carried out by the steam turbine and, in the end, this represents a power limit 23 for the primary regulation steam turbine nominal power 19.

Finally, the steam turbine actuating valves are positioned taking account of their permissible capabilities such that, in total, they result in the required power demand or power change 21, which corresponds to the primary regulation steam turbine nominal power 19.

If, for example, the restriction of the actuating valves in the corresponding working steam supply lines is reduced for network frequency support purposes, then this has effects both on the instantaneous power capability of the steam turbine and on a reduction in the reserve power available. All the change capabilities of the steam turbine installation are recorded, and are available in situ for all the regulation measures.

Furthermore, the information about the instantaneous primary regulation gas turbine nominal power 44 is signaled to the gas turbine regulation 31, thus allowing the power component of the gas turbine 7 likewise to be readjusted. In the case of the single-shaft installation illustrated in FIG. 2 with a common generator both for the steam turbine installation and for the gas turbine installation, the gas turbine does not react, or reacts only very slowly because of the rapid reaction of the steam turbine.

The gas turbine regulation 31 in fact reacts to a power increase on the generator on the basis of the primary regulation gas turbine nominal power 44. The reaction of the gas turbine is correspondingly delayed until the steam turbine power contribution is completely exhausted.

In order to achieve a simultaneous reaction by the steam turbine and gas turbine, the limited primary regulation steam turbine nominal power 21 is, according to the solution, either added to the so-called total block nominal power 28, that is to say the block nominal power 26 including the primary regulation gas turbine nominal power 44 (see 29), in this case the block nominal power means that total power which can be provided at the generator 6 by the gas and steam turbine installation, at which power level the network nominal frequency is produced—or the primary regulation steam turbine nominal power 19 is subtracted from the block actual power 27 (see 30)—which can be tapped off from the generator G and which is provided in its entirety by the gas turbine and the steam turbine.

Figure 3:
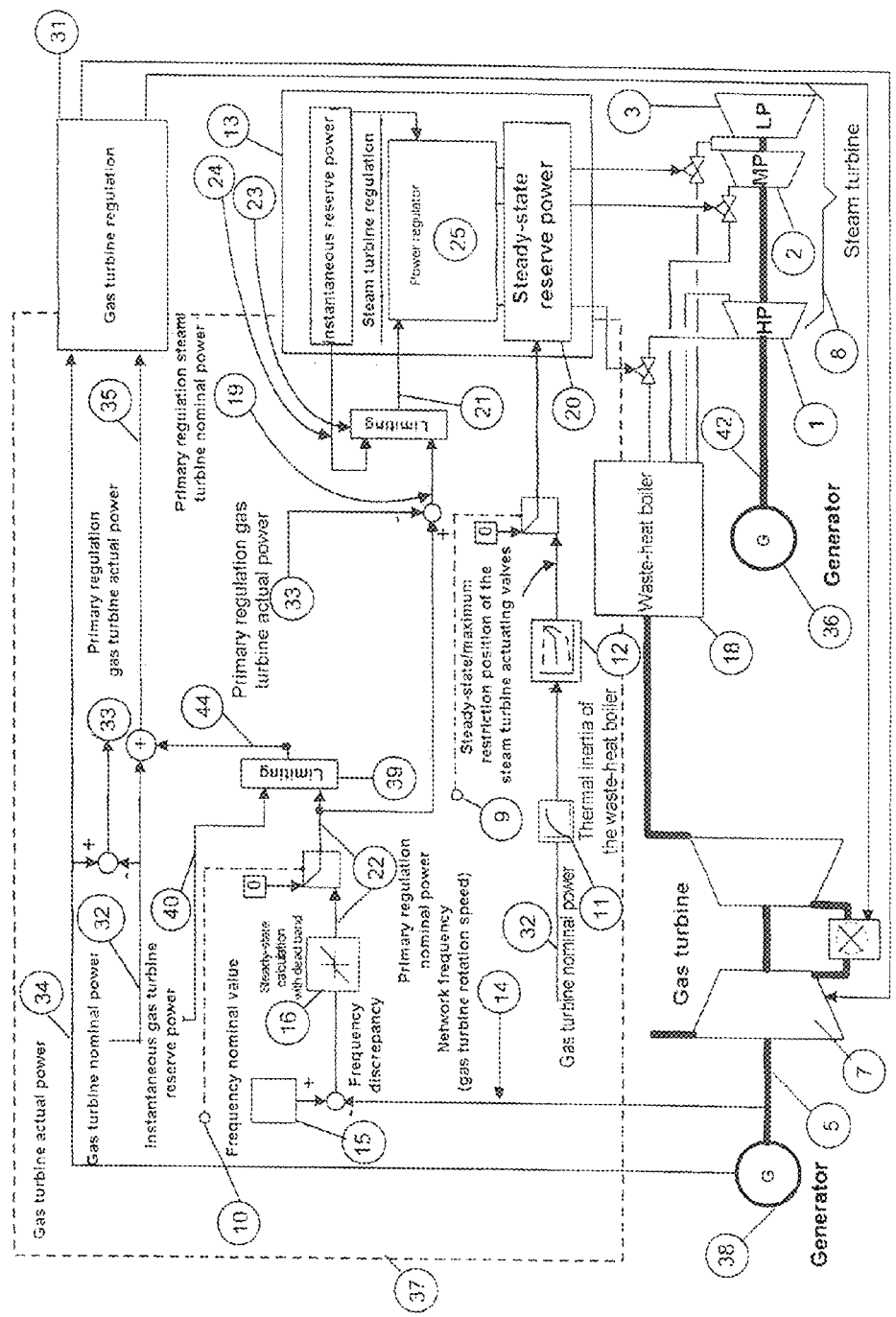
FIG. 3 shows a block diagram of the control concept for a combined multishaft gas/steam turbine installation without a gas turbine model for calculation of the primary regulation gas turbine actual power.

The regulation concept according to the solution is also equally applicable to a multishaft installation, which is illustrated schematically in FIG. 3. In this case, the gas turbine 7 is thus connected to a generator 38 via a separate shaft 5 while, in contrast, the steam turbine 8 drives the generator 36 associated with it via another, separate shaft 42.

The method according to the solution for primary regulation is in principle comparable with that for regulation of a single-shaft installation as shown in FIG. 2. The only difference from the exemplary embodiment shown in FIG. 2 is that the actual power of the gas turbine 34 is tapped off and determined at the generator 38, and the primary regulation gas turbine actual power 33 can thus be determined by subtraction of the gas turbine nominal power 32 from the gas turbine actual power 34. The primary regulation steam turbine nominal power 19 can be determined directly (without a gas turbine model 17) by subtraction of the primary regulation nominal power 22 from the primary regulation gas turbine actual power 33. The reaction of the steam turbine 8 to a frequency discrepancy at the steam turbine generator is separate from the gas turbine contribution. The gas turbine regulation 31 can therefore react to the primary regulation gas turbine nominal power 44 without compensation for the steam turbine contribution 29 or 30 (see FIG. 2).

Figure 4:
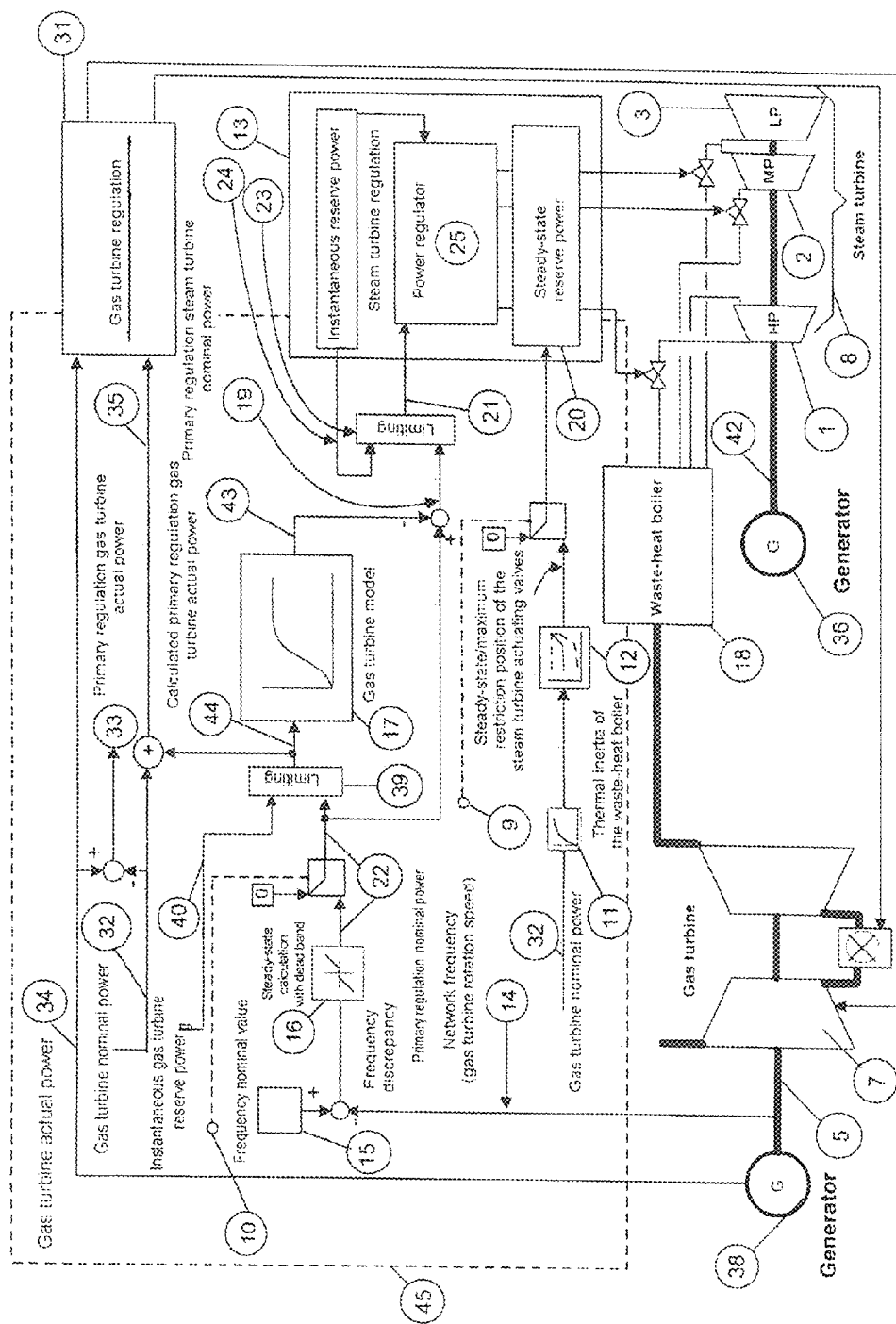
FIG. 4 shows a block diagram of the regulation concept for a combined multishaft gas/steam turbine installation with a gas turbine model for calculation of the primary regulation gas turbine actual power.

FIG. 4 shows the method according to the solution for primary regulation of a multishaft installation taking account of the gas turbine model 17 for calculation of the primary regulation gas turbine actual power. In contrast to the primary regulation gas turbine actual power 33 (FIG. 3) the gas turbine model 17 prevents the transfer of the possibly unstable primary regulation behavior of the gas turbine regulation 31 to the calculation of the primary regulation steam turbine nominal power 19.

The following table of terminology is intended to be used to provide a quick overview of the power expressions used:

| | |
|---|---|
| Primary regulation nominal power 22 | Power required to produce a stable network frequency. Determined from the difference between the nominal and actual frequency |
| Primary regulation gas turbine nominal power 44 | Power which the gas turbine must provide in order to produce a stable network frequency |
| Primary regulation gas turbine actual power 33 | Power produced by the gas turbine for stabilization of the network frequency. Determined from the difference between the steady-state gas turbine nominal power and the power measured at the gas turbine generator |
| Calculated primary regulation gas turbine actual power 43 | Power which must be provided by the gas turbine to produce a stable network frequency. Determined by a mathematical model of the gas turbine |
| Primary regulation steam turbine nominal power 19 | Power which must be provided by the steam turbine in order to produce a stable network frequency |
| Gas turbine reserve power 40 | Power available from the gas turbine which can be released for frequency support purposes |
| Steam turbine reserve power 20 | Power available from the steam turbine which can be released at short notice for frequency support purposes |
| Gas turbine actual power 34 | Actual power emitted from the gas turbine to a separate generator |
| Gas turbine nominal power 32 | Nominal power to be emitted from the gas turbine to a separate generator in order to maintain a basic load |
| Block nominal power 26 | Total power to be emitted to a generator from a single-shaft gas and steam turbine installation in order to maintain a basic load |
| Block actual power 27 | Actual power emitted to a generator from a single-shaft gas and steam turbine installation |

LIST OF REFERENCE SYMBOLS

1 High-pressure steam turbine stage
2 Medium-pressure steam turbine stage
3 Low-pressure steam turbine stage
4 Regulation mechanism
5 Shaft
6 Generator
7 Gas turbine
8 Steam turbine
9 On/off switch
10 On/off switch
11 Thermal inertia of the waste-heat boiler
12 Correction function
13 Steam turbine regulation
14 Gas-steam turbine rotation speed
15 Frequency nominal value
16 Steady-state calculation with dead band
17 Mathematical gas turbine model
18 Waste-heat boiler
19 Primary regulation steam turbine nominal power
20 Steady-state reserve power of the steam turbine
21 Limited primary regulation steam turbine nominal power, power change of the steam turbine
22 Primary regulation nominal power
23 Limiting
24 Instantaneous reserve power of the steam turbine
25 Power regulator of the steam turbine
26 Block nominal power
27 Block actual power
28 Block nominal power including primary regulation gas turbine nominal power
29 Addition
30 Subtraction
31 Gas turbine regulation
32 Gas turbine nominal power
33 Primary regulation gas turbine actual power
34 Gas turbine actual power 35 Gas turbine nominal power including primary regulation gas turbine nominal power
36 Generator
37 Regulation device of multishaft installations
38 Generator
39 Limiting
40 Instantaneous gas turbine reserve power
41 Calculated instantaneous gas turbine power
42 Shaft
43 Calculated primary regulation gas turbine actual power
44 Primary regulation gas turbine nominal power
45 Regulation device of multishaft installations

The invention claimed is:

1. A method for primary regulation of a combined gas and steam turbine installation in network operation, wherein the combined gas and steam turbine installation includes a gas turbine and a steam turbine arranged along at least one shaft, the method comprising:
  operating at least one steam turbine actuating valve on a restricted basis along a working steam supply line to at least one pressure stage of the steam turbine so as to provide a steady-state steam turbine reserve power, wherein the at least one steam turbine actuating valve is changed to a less restricted state if a network frequency decreases so as to require network frequency support;
  detecting a frequency discrepancy between an actual frequency and a frequency nominal value, the actual frequency being dependent on a rotation speed of the at least one shaft connected to the gas turbine; determining a primary regulation nominal power based on the frequency discrepancy;
  determining a power discrepancy between the primary regulation nominal power and a calculated primary regulation gas turbine actual power emitted from the gas turbine;
  determining a primary regulation steam turbine nominal power based on the power discrepancy; and
  positioning one of the at least one steam turbine actuating valve such that a steam turbine actual power emitted from the steam turbine corresponds to the primary regulation steam turbine nominal power.

2. The method as recited in claim 1, further comprising calculating a steady-state restriction position of the at least one steam turbine actuating valve based on one of a gas turbine nominal power and an instantaneous gas turbine power and converting the steady-state restriction position to the steady-state steam turbine reserve power.

3. The method as recited in claim 1, further comprising determining the calculated primary regulation gas turbine actual power based on $$P_{calculated\ primary\ gas\ turbine\ actual} = KDF\left[\frac{1}{(1+S\cdot T/N)}\right]^N$$

where $$T = f\left(KDF\frac{T_1}{1+ST_2}\right)$$

wherein T, T1, and T2 are time constants,
S is a Laplace operator;
N is order of a model; and
KDF is the primary regulation nominal power.

4. The method as recited in claim 1, further comprising subtracting the primary regulation gas turbine actual power from the primary regulation nominal power so as to determine the power discrepancy and using the power discrepancy directly as the primary regulation steam turbine nominal power.

5. The method as recited in claim 1, wherein the determining of the power discrepancy includes subtracting the calculated primary regulation gas turbine actual power from the primary regulation nominal power.

6. The method as recited in claim 1, wherein the determining the primary regulation steam turbine nominal power includes using the primary regulation steam turbine nominal power after limiting and taking account of an instantaneous steam turbine reserve power available at an instant from the steam turbine installation.

7. The method as recited in claim 1, wherein the at least one shaft is a single-shaft driving a single generator so as to produce energy, and further comprising:
  predetermining a block nominal power including the primary regulation gas turbine nominal power so as to produce a nominal network frequency for network operation; and
  regulating a power of the gas turbine including regulating a block actual power corresponding to a power emitted at an instant via the at least one shaft to the single generator based on the block nominal power so as to regulate power of the gas turbine and one of adding the primary regulation steam turbine nominal power to the block nominal power and subtracting the primary regulation steam turbine nominal power from the block actual power.

8. The method as recited in claim 1, further comprising determining a primary regulation gas turbine nominal power based on an instantaneous gas turbine reserve power.

* * * * *